3,646,002
COPPER CONTAINING DISAZO TRIAZINE DYES
Herbert Francis Andrew and Robert Higginbottom, Manchester, England, assignors to Imperial Chemical Industries Limited, London, England
No Drawing. Filed Jan. 12, 1970, Ser. No. 2,389
Claims priority, application Great Britain, Jan. 16, 1969, 2,663/69
Int. Cl. C09b 62/08
U.S. Cl. 260—146 T                              6 Claims

ABSTRACT OF THE DISCLOSURE

Dyestuffs represented by the general formula:

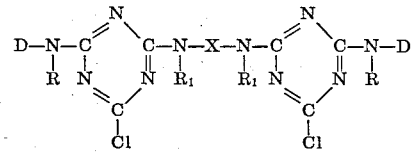

wherein
D represents a radical of a monoazo compound which contains at least one $SO_3H$ group and which contains a heavy metal atom in the form of a metal complex,
either R and $R_1$ represent H or saturated aliphatic radicals having up to 4 carbon atoms, and
X represents a benzene, diphenylene or naphthalene nucleus which may contain substituents, or an aliphatic radical having at least 2 carbon atoms, or

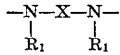

represents 1,4-piperazinylene
are useful reactive dyestuffs for cellulose textile materials giving a wide range of shades of excellent fastness to washing. They are notable for the high proportion which fixes on the material, especially when applied from saline dyebaths.

---

This invention relates to new active dyestuffs primarily valuable for the colouring of cellulose textile materials.

According to the invention there are provided dyestuffs represented by the general formula:

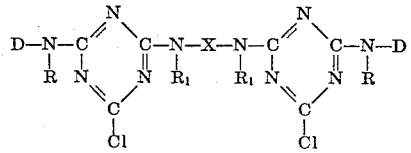

(1)

wherein
D represents a radical of a monoazo compound which contains at least one $SO_3H$ group and which contains a heavy metal atom in the form of a metal complex,
either R and $R_1$ represent H or saturated aliphatic radicals having up to 4 carbon atoms, and
X represents a benzene, diphenylene or naphthalene nucleus which may contain substituents, or an aliphatic radical having at least 2 carbon atoms, or

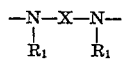

represents 1,4-piperazinylene.

As examples of aliphatic radicals represented by R and $R_1$ there may be mentioned alkyl groups of 1 to 4 carbon atoms, e.g. methyl, ethyl, and butyl, also hydroxyalkyl groups, e.g. β-hydroxy-ethyl.

As examples of substituents which may be present in X, there may be mentioned methyl, chlorine, methoxy, carboxylic acid and sulphonic acid.

As examples of radicals represented by D, there may be mentioned 1:1 copper, nickel, chromium or cobalt complexes of azonaphthalene or phenylazo naphthalene radicals which contain an o,o'-dihydroxyazo or o-hydroxy-o'-carboxyazo grouping, also mixed 1:2-chromium or cobalt complexes in which preferably only the NR group depicted in Formula 1 is present in the two azo moieties taken together. In the case of the 1:1-cobalt and chromium complexes, the NR group may be present in a colourless ligand also complexly bound to the metal atom. Apart from the substituents already mentioned the benzene and naphthalene nuclei in D can contain a wide variety of substituents, e.g. OH, $CO_2H$, $NHCOCH_3$. The radical D must contain at least one and preferably contains at least three, sulphonic acid groups. Although in general it is preferred that D should contain only the NR group depicted in Formula 1, there are circumstances in which a second NR group can be present e.g. where the second NR group is o and p to sulphonic acid groups and hence is inert to acylation, e.g. as in 1-amino-8-naphthol-2,4-disulphonic acid.

A preferred class of dyestuffs is that in which the linking group is phenylene, sulphophenylene or disulphodiphenylene and D—NR is the radical of a copper-containing aminophenylazonaphthalene or a copper-containing aminoazonaphthalene compound containing at least three sulphonic acid groups, especially in combinations which provide a total of at least 8 sulphonic acid groups.

The invention also provides a process for manufacture of the new dyestuffs which comprises condensing together two molecular proportions of cyanuric chloride, two molecular proportions of an aminoazo compound of formula DNHR where D and R have the meanings stated above and one molecular proportion of a diamine of formula:

$$R_1NH—X—NHR_1 \qquad (2)$$

wherein $R_1$ and X have the meanings stated abve.

The above process can conveniently be carried out by stirring a suspension of the cyanuric chloride in an aqueous medium with the aminoazo compound at a temperature of 0 to 20° C. until one chlorine atom of the cyanuric choride has been replaced by the radical of the dyestuff, then adding the diamine and continuing reaction at a slightly higher temperature, usually in the range 30° to 50° C. until a second halogen atom on the triazine nucleus has reacted with each amino group. Alternatively, the cyanuric chloride can be reacted first with the diamine at the lower temperature to form a bis(dichlorotriazine) derivative and then with the aminoazo compound at the higher temperature. The condensations are preferably carried out at a pH of from 4 to 7, adding an acid-binding agent to neutralise the hydrochloric acid as it is liberated during the reaction. When the reaction is complete the new reactive dyestuffs can be isolated by the usual techniques adopted for isolation of water-soluble reactive dyestuffs, for example, by salting out and filtration, or by spray-drying the reaction mixture in which the dyestuff has been formed. If desired, stabilizers, for example, alkali metal hydrogen phosphates, can be added.

As examples of diamino compounds of Formula 2 which may be used there may be mentioned:

1:3-diaminobenzene,
1:4-diaminobenzene,
1:4-diaminobenzene-2-sulphonic acid,
1:3-diaminobenzene,-4-sulphonic acid,
1:4-diaminobenzene-2-carboxylic acid,
2:6-diaminotoluene-4-sulphonic acid,
2:4-diaminotoluene-6-sulphonic acid, 2-methyl-1:4-diaminobenzene,
6-methyl-1:3-diaminobenzene,
6-methyl-1:3-diaminobenzene-4-sulphonic acid,
1-methylamino-4-aminobenzene-2-sulphonic acid,
1-n-butylamino-4-aminobenzene-2-sulphonic acid,
4:4'-diamino-1:1'-diphenyl-2:2'-disulphonic acid,
4:4'-diamino-3:3'-dimethyl-1:1'-diphenyl-2:2'-disulphonic acid,
4:4'-diamino-1:1'-diphenyl-3-sulphonic acid,
1:3-diamino-2:4:6-trimethylbenzene-5-sulphonic acid,
2:6-diamino toluene-4-sulphonamide,
4:4'-diamino-1:1'-diphenyl-3:3'-dicarboxylic acid,
4:4'-diamino-3:3'-carboxymethoxy-1:1'-diphenyl,
1:4'-diamino-2:5-dimethoxybenzene,
ethylene diamine,
1:3-propylenediamine,
hexamethylene diamine,
1:2-propylenediamine piperazine,
1:4'-diamino-2:5-dimethoxybenzene,
2-chloro-1:5-diaminobenzene.

As examples of aminoazo compounds which may be used there may be mentioned the following classes:

(i) 1:1 metal complex, especially copper complex, derivatives of monazo compounds of the formula:

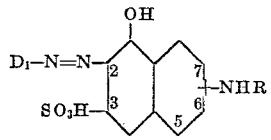

wherein $D_1$ represents a benzene or naphthalene radical which contains a metallisable (e.g. OH, COOH) group ortho to the azo group and is free from NHR groups, the —NHR group is preferably attached to the 6-, 7- or 8- position of the naphthalene nucleus, and which may contain a sulphonic acid group in the 5- or 6-position of the naphthalene nucleus.

Particularly valuable deystuffs are obtained from those where $D_1$ represents a sulphonated phenyl or naphthyl radicals; the phenyl radical may be further substituted for example, by halogen atoms such as chlorine, alkyl radicals such as methyl, acylamino groups such as acetylamino and alkoxy radicals such as methoxy.

(ii) 1:1 metal complex, especially copper complex, derivatives of monoazo compounds of the formula:

$$D_1-N=N-D_2-NHR \qquad (4)$$

wherein $D_1$ stands for a radical as defined for class (i) and $D_2$ represents the radical of an enolisable ketomethylene compound (such as an acetoacetarylide or a 5-pyrazolone)) having the —OH group in o-position to the azo group, or of (iii) Monoazo compounds of the formula:

wherein $D_1$ represents an arylene radical of the benzene or naphthalene series having a metallisable group ortho to the azo group and K represents the radical of a naphthol sulphonic acid having the OH group o- to the azo group or the radical of an enolisable ketomethylene compound. $D_1$ preferably represents a radical of the benzene series containing a sulphonic acid group.

The 1:1-metal complex compounds of the dyes of Formulae 3, 4 and 5 include the so-called 1:1 complexes of cobalt and chromium in which the complex-forming valencies of the metal atom are partly satisfied by a polydentate or a plurality of monodentate colourless ligand forming compounds.

(iv) A further class consists of 1:1 metal complexes of cobalt and chromium with monoazo metallisable compounds which are free from acylatable NHR groups, in which the complex-forming valencies of the metal atom are partly satisfied by a colourless ligand-forming compound containing the NHR group.

As examples of compounds of classes (i) to (iv) there may be mentioned the following:

In class (i):
The copper complex of 8-amino-1-hydroxy-2-(2'-hydroxy-5'-sulphophenylazo)naphthalene-3:6 - disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5 - disulphonic acid,
The copper complex of 8-amino-1-hydroxy-2-(2'-hydroxy-3'-chloro-5-sulphophenylazo)naphthalene-3:6 - disulphonic acid,
The copper complex of 6-(4'-amino-3'-sulphonailino)-1-hydroxy-2-(2''-carboxyphenylazo)naphthalene - 3 - sulphonic acid,
1:1-chromium complex of 8-amino-hydroxy-2-(2'-hydroxy-5'-nitrophenylazo)naphthalene - 3:6 - disulphonic acid,
The nickel complex of 6-amino-1-hydroxy-2-(2'-hydroxy-5'-sulphophenylazo)naphthalene-3:5 - disulphonic acid.

In class (ii):
The copper complex of 1-3'-aminophenyl-3-methyl-4-(2''-carboxy-4''-sulphophenylazo)-5-pyrazolone,
The copper complex of 1-3'-aminophenyl-3-methyl-4-(2''-hydroxy-3'':5''-disulphophenylazo)-5-pyrazolone,
The copper complex of 1-(2'-methyl-3'-amino-5'-sulphophenyl)-3-methyl-4-(2''-hydroxy - 5'' - sulphophenylazo)-5-pyrazolone,
The cobalt complex from 1-(4'-aminophenyl)-3-methyl-4-(1''-hydroxy - 4'':8'' - disulphonaphth - 2'' - ylazo)-5-pyrazolone and diethylenetriamine,
The 1:1 chromium complex of 1-(2'-methyl-3'-amino-5'-sulphophenyl)-3-methyl-4-(2''-hydroxy - 3'':5'' - disulphophenylazo)-5-pyrazolone.

In class (iii):
The copper complex of 8-amino-1-hydroxy-5:7-disulpho-2-(2'-hydroxy - 5' - amino - 3' - sulphophenylazo)naphthalene,
The copper complex of 1:2'-dihydroxy-6':8-diamino-1':2-azonaphthalene-4':5:7-trisulphonic acid,
The copper complex of 1-(4'-sulphophenyl)-3-methyl-4-(2''-hydroxy - 3'' - amino - 5'' - sulphophenylazo)-5-pyrazolone.

In class (iv):
The 1:1 cobalt complex from 1 - phenyl-3-methyl-4-(1''-hydroxy - 4'':8'' - disulphonaphth-2''-ylazo)-5-pyrazolone and triethylene tetramine.

In class (v):
The mixed 1:2 - chromium complex of 1-phenyl-3-methyl-4-(2'-hydroxy - 3' - sulpho - 5' - nitrophenylazo)-5-pyrazolone and 2-amino - 8 - hydroxy-7-(2'-carboxy-4-sulphophenylazo)naphthalene-6-sulphonic acid.

The invention also provides a process for manufacture of the new dyestuffs which comprises subjecting a dyestuff of Formula 1, in which D represents a radical of a metallisable monoazo compound which contains at least one sulphonic acid group and either 2 hydroxyl groups or 1 hydroxyl and 1 carboxylic acid group o,o' to the azo group, and R, $R_1$, X and Y have the meanings stated in connection with Formula 1, to the action of a metal yielding agent.

As examples of metal-yielding agents which may be used, there may be mentioned copper sulphate.

This process may be carried out by stirring a mixture of the dyestuff and the metal-yielding agent in an aqueous medium at elevated temperatures, e.g. from 30 to 95° C., maintaining the pH at from 4 to 7 to lessen the possibility of hydrolysis of the chlorine atoms on the triazine nuclei.

The invention also provides a process for manufacture of the new dyestuffs wherein

is the radical of a copper complex monoazo compound of formula:

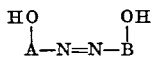

where A is benzene or naphthalene and B is naphthalene, and one of A and B contains the NHR group, which comprises subjecting a compound of the Formula 1 in which X, R and $R_1$ have the meanings stated but D represents a radical of the formula:

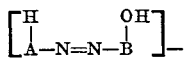

to the action of a copper salt in the presence of an oxidising agent.

This process may be conveniently carried out in aqueous medium at a pH of about 4 to 5 (e.g. in the presence of an acetic acid/acetate buffer) at a temperature within the range of 10 to 70° C. Suitable oxidising agents include, for example, alkali metal peroxides, percarbonates, perborates, organic peracids, acyl peroxides or air in the presence of O-transferring catalysts such as anthraquinone-2-sulphonic acid or decahydronaphthalene; the preferred oxidising agent is hydrogen peroxide.

The new reactive dyestuffs are valuable for colouring cellulose textile materials, for example, textile materials comprising natural or regenerated cotton. For colouring such materials, the new dyestuffs are preferably applied, either by a printing but preferably a dyeing process, to the cellulose textile material in conjunction with a treatment with an acid-binding agent, e.g. caustic soda, sodium carbonate, silicate or bicarbonate, which may be applied to the cellulose textile material before, during or after the application of the dyestuff. When so applied the new dyestuffs react with the cellulose and yield shades possessing excellent fastness to washing. They are notable for the high proportion which fixes on the material, especially when applied from saline dyebaths.

The invention may be illustrated but is not limited by the following examples in which parts are by weight:

EXAMPLE 1

A solution of 16.54 parts of the trisodium salt of the copper complex of 1-amino-7-(2'-hydroxy-5'-aminophenylazo)-8-naphthol - 2,3' - trisulphonic acid (described in Example 4 of British patent specification 989,506) in 300 parts of water is added to a suspension of 4.6 parts of cyanuric chloride in 40 parts of acetone and 200 parts of ice-water at 0–5° C., maintaining the pH at 6.0–6.5 by the gradual addition of a 10% aqueous solution of sodium carbonate. When the condensation is complete, a solution of 1.35 parts of 1,4-diaminobenzene dissolved in 100 parts of water is added and the temperature is raised to 40–45° C., the pH being maintained at 6.5–7.0 by the addition of 10% aqueous sodium carbonate. At the end of the condensation the dyestuff is precipitated by the addition of 90 parts of sodium chloride, filtered off and dried. The dyestuff is found to contain 1 atom of hydrolysable chlorine per azo group. When applied to cellulosic materials in the presence of an acid-binder, reddish-blue shades of good fastness to light and washing are obtained.

EXAMPLE 2

A solution of 3.1 parts of the disodium salt of 1,4-diaminobenzene-2,5-disulphonic acid in 30 parts of water is added to a suspension of 5.4 parts of cyanuric chloride in 30 parts of acetone and 100 parts of ice-water at 0–5° C., maintaining the pH at 6.0–6.5 by the gradual addition of a 10% aqueous solution of sodium carbonate. When the condensation is complete, after about 4 hours the suspension is filtered to remove excess cyanuric chloride. The filtrate is then added to a solution of 16 parts of the tetrasodium salt of the copper complex of 1-amino-7-(1'-hydroxy-naphth - 2' - ylazo)-8-naphthol-3, 4',6,8'-tetrasulphonic acid in 300 parts of water and the temperature is raised to 40–45° C., the pH being maintained at 6.5–7.0 by the addition of 10% aqueous sodium carbonate. When condensation is complete, the dyestuff is precipitated by the addition of 130 parts of sodium chloride, filtered off and dried. The dyestuff is found to contain one atom of hydrolysable chlorine per azo group. When applied to cellulosic materials in the presence of an acid-binder, blue shades of good fastness to light and washing are obtained.

The following table gives the shades of further new dyestuffs of the invention which are obtained as in Example 1 by condensing two molecular proportions of the dichlorotriazinyl derivative of the metal complex named in the second column with one molecular proportion of the diamine named in the third column of the table or alternatively as in Example 2 by condensing one molecular proportion of the diamine named in the third column with two molecular proportions of cyanuric chloride and the product with two molecular proportions of the dye-base named in the second column of the table.

| Example | Dye base | Diamine | Shade |
| --- | --- | --- | --- |
| 3 | 1-amino-7-(2'-hydroxy-5'-aminophenylazo)-8-naphthol-2,3',4-trisulphonic acid (Cu). | 1,4-diaminobenzene-2-sulphonic acid | Reddish blue. |
| 4 | do | 4,4'-diamino-1,1'-diphenyl-2,2'-disulphonic acid. | Do. |
| 5 | do | 2,6-diaminotoluene-4-sulphonic acid | Do. |
| 6 | 1-amino-7-(2'-hydroxy-6'-aminonaphthol)-2,4,4'-trisulphonic acid (Cu). | 1,4-diaminobenzene-2-sulphonic acid | Blue. |
| 7 | do | 4,4'-diamino-1,1'-diphenyl-2,2'-disulphonic acid. | Do. |
| 8 | do | 2,6-diaminotoluene-4-sulphonic acid | Do. |
| 9 | 1-amino-7-(1'-hydroxynaphthyl-2'-azo)-8-naphthol-3,4,6,8'-tetra sulphonic acid (Cu). | 1,4-diaminobenzene | Reddish blue. |
| 10 | 1-amino-7-(1'-hydroxynaphthyl-2'-azo)-8-naphthol-3,4',6,8'-tetrasulphonic acid (Cu). | 1,4-diaminobenzene-2-sulphonic acid | Do. |
| 11 | do | 1,4-draminobenezene | Do. |
| 12 | do | 2,6-diaminotoluene-4-sulphonic acid | Do. |
| 13 | do | 1,3-diaminobenzene | Do. |
| 14 | do | Ethylenediamine | Do. |
| 15 | do | 4,4'-diamino-1,1'-diphenyl-2,2'-disulphonic acid. | Do. |
| 16 | do | 4,4'-diamino-1,1'-diphenyl-3-sulphonic acid. | Do. |
| 17 | do | 4,4'-diamino-3,3'-dimethoxy-1,1'-diphenyl-2,2'-disulphonic acid. | Do. |
| 18 | do | 2,6-diaminonaphthalene-4,8-disulphonic acid. | Do. |
| 19 | do | 4,4'-diaminodiphenylether | Do. |
| 20 | do | 4,4'-diamino-3,3'-dimethyl-1,1'-diphenyl-2,2'-disulphonic acid. | Do. |
| 21 | do | 4,4'-diamino-1,1'-diphenyl sulphone | Do. |
| 22 | 1-amino-7-(1'-hydroxynaphthyl-2'-azo)-8-naphthol-3,4',6,8'-tetrasulphonic acid (Cu). | 2-methyl-1,4-diaminobenzene | Do. |

TABLE—Continued

| Example | Dye base | Diamine | Shade |
|---|---|---|---|
| 23 | do | 2,5-diaminobenzoic acid | Do. |
| 24 | do | 3,5-diaminobenzoic acid | Do. |
| 25 | do | 4,4'-diamino-3,3'-dimethoxy-1,1'-diphenyl. | Do. |
| 26 | 2-amino-6-(2'-hydroxyphenylazo)-5-naphthol-1,5',7-trisulphonic acid (Cu). | 4,4'-diamino-1,1'-diphenyl-2,2'-disulphonic acid. | Rubine. |
| 27 | do | 3,5-diaminobenzoic acid | Do. |
| 28 | do | 1,3-diaminobenzene | Do. |
| 29 | do | 4-amino-N-methylaniline-2-sulphonic acid. | Do. |
| 30 | do | 4-amino-N-n butylaniline-2-sulphonic acid. | Do. |
| 31 | do | 2,6-diaminotoluene-4-sulphonic acid | Do. |
| 32 | 2-amino-6-(2'-hydroxyphenylazo)-5-naphthol-3',5',7-trisulphonic acid (Cu). | 4,4'-diamino-1,1'-diphenyl-2,2'-disulphonic acid. | Do. |
| 33 | 1-amino-7-(2'-hydroxy-3'-chlorophenylazo)-8-naphthol-3,5',6-trisulphonic acid (Cu). | 4,4'-diamino-1,1'-diphenyl-2,2'-disulphonic acid. | Do. |
| 34 | do | 1,4-diaminobenzene | Do. |
| 35 | do | 1,3-diaminobenzene | Do. |
| 36 | 2-amino-6-(2'-hydroxyphenylazo)-5-naphthol-1,5',7-trisulphonic acid (Ni). | 2,6-diaminotoluene-4-sulphonic acid | Do. |
| 37 | do | 6-methyl-1,3-diaminobenzene | Do. |
| 38 | Mixed complex of 1-phenyl-3-methyl-4-(2''-hydroxy-5''-nitrophenylazo)-5-pyrazolone-3''-sulphonic acid and 2-amino-7-(2'-carboxyphenylazo)-8-naphthol-4',6-disulphonic acid (1:2 Cr). | 1,4-diaminobenzene | Brown. |
| 39 | do | 1,3-diamino-2,4,6-trimethylbenzene-5-sulphonic acid. | Do. |
| 40 | 2-amino-6-(2'-hydroxy-4',5'-dichlorophenylazo)-5-naphthol-1,3',7-trisulphonic acid (Cu). | 1,3-diaminobenzene | Reddish violet. |
| 41 | do | 2-methyl-1,4-diaminobenzene | Do. |
| 42 | do | 4,4'-diamino-1,1'-diphenyl-2,2'-disulphonic acid. | Do. |
| 43 | 2(4'-aminophenylamino)-6-(2''-carboxyphenylazo)-5-naphthol-3',7-disulphonic acid (Cu). | 1,4-diaminobenzene-2-sulphonic acid | Rubine. |
| 44 | do | 4,4'-diamino-1,1'-diphenyl-2,2'-disulphonic acid. | Do. |
| 45 | 2-amino-6-(2'-hydroxy-3'-nitrophenylazo)-5-naphthol-1,5',7-disulphonic acid (Cu). | 3,5-diaminobenzoic acid | Helio. |
| 46 | do | 2,6-diaminonaphthalene-4,8-disulphonic acid. | Do. |
| 47 | 1-(3'-amino-2'-methylphenyl)-3-methyl-4-(2''-hydroxyphenylazo)-5-pyrazolone-3'',5'',5''-trisulphonic acid (Cu). | do | Yellow. |
| 48 | Complex from 1-phenyl-3-methyl-4-(2'-hydroxynaphth-1'-ylazo)-5-pyrazolone-4'-sulphonic acid and triethylenetetramine (1,1 Co). | 2,6-diaminotoluene-4-sulphonic acid | Dull red. |
| 49 | Complex from 1-phenyl-3-methyl-4-(1'-hydroxynaphth-2'-ylazo)-5-pyrazolone 4',8'-disulphonic acid and triethylenetetramine (1:1 Co). | 2,6-diaminobenzoic acid | Do. |
| 50 | Complex from 1-(4'-aminophenyl)-3-methyl-4-(1''-hydroxynaphth-2''-ylazo)-5-pyrazolone-4'',8''-disulphonic acid and diethylene triamine (1:1 Co). | 1:4-diaminobenzene-2-sulphonic acid | Do. |
| 51 | 1-amino-7-(1'-hydroxynaphth-2'-ylazo)-8-naphthol-3,4',6,6',8'-pentasulphonic acid (Cu). | 1,3-diaminobenzene | Reddish blue. |
| 52 | do | 1,4-diaminobenzene | Do. |
| 53 | do | 3,6-diaminobenzoic acid | Do. |
| 54 | 1-amino-7-(1'-hydroxynaphth-2'-ylazo)-8-naphthol-3,5',6,7'-tetrasulphonic acid (Cu). | 4,4'-diamino-1,1'-diphenyl-2,2'-disulphonic acid. | Bluish violet. |
| 55 | do | 2,6-diaminonaphthalene-4,8-disulphonic acid. | Do. |
| 56 | 2-amino-6-(2'-hydroxyphenylazo)-5-naphthol-1,3',5',7-tetrasulphonic acid (Cu). | 4,4'-diamino-1,1'-diphenyl-2,2'-disulphonic acid. | Rubine. |
| 57 | 2-(4'-aminophenylamino)-6-(2''-hydroxy-3''-nitrophenylazo)-5-naphthol-3',5'',7-trisulphonic acid (Cu). | do | Bluish violet. |
| 58 | 2-amino-6-(1'-hydroxynaphth-2'-ylazo)-5-naphthol-1,4',7,8'-tetrasulphonic acid (Cu). | do | Purple. |
| 59 | do | 1,3-diaminobenzene-4-sulphonic acid | Do. |
| 60 | do | 1,4-diaminobenzene-2-sulphonic acid | Do. |

EXAMPLE 61

A solution of 8.7 parts of the tetrasodium salt of the copper complex of 1 - amino - 7-(1'-hydroxynaphth-2'-ylazo) - 8 - naphthol - 3,4',6,8' tetrasulphonic acid in 100 parts of water is added to a suspension of 2.3 parts of cyanuric chloride in 20 parts of acetone and 100 parts of ice-water at 0–5°, maintaining the pH at 6.0–6.5 by the gradual addition of a 10% aqueous solution of sodium carbonate. When the condensation is complete a solution of the monosodium salt of 2.3 parts of 1,4-diaminobenzene-2-sulphonic acid in 30 parts of water is added and the temperature is raised to 10–15°, the pH being maintained at 6.5–7.0 by the addition of 10% aqueous sodium carbonate. When the reaction is complete the solution is added to a suspension of 2.3 parts of cyanuric chloride in 20 parts of acetone and 70 parts of ice-water at 0–5° C., the pH being maintained at 6.0–6.5 by the addition of 10% aqueous sodium carbonate. When the condensation is complete a solution of a further 8.7 parts of the copper complex in 100 parts of water is added and the temperature is raised to 40–45°, maintaining the pH between 6.5–7.0 by the addition of 10% aqueous sodium carbonate. When the reaction is complete the dyestuff is precipitated by the addition of potassium chloride, filtered off and dried. The dyestuff is found to contain one atom of hydrolysable chlorine per azo group and when applied to cellulosic materials in the presence of an acid-binding agent gives blue shades of good fastness to light and washing.

EXAMPLE 62

A solution of 3.1 parts of the disodium salt of 1,4-diaminobenzene-2,5-disulphonic acid in 30 parts of water is added to a suspension of 5.4 parts of cyanuric chloride in 30 parts of acetone and 100 parts of ice-water at 0–5° C., maintaining the pH at 6–6.5 by the gradual addition of a 10% aqueous solution of sodium carbonate. When the condensation is complete, the suspension is filtered to remove excess cyanuric chloride. The filtrate is then added to a solution of 7.26 parts of the disodium salt of 1-amino-8-naphthol-3,6-disulphonic acid in 80 parts of water and the temperature is raised to 35–40° C., the pH being maintained at 3.5–4.0 by the addition of 10% aqueous sodium carbonate. When the reaction is complete a suspension of the diazonium salt from 6.1 parts of 2-naphthylamine-4,8-disulphonic acid is added at 0–5° C. and pH 5. When the coupling is complete, the red monoazo dye is salted, and filtered off and redissolved in 250 parts of water. A solution of 12.5 parts of copper sulphate pentahydrate in 40 parts of water is then added at pH 3.5 and the pH is then raised to 4.5 by the addition of sodium acetate. 35 parts of 20 volume hydrogen peroxide are then added over 1 hour at 25° C. and pH 4.5–5. After stirring for 1 hour the product is salted out, filtered off and dried. The blue dyestuff is identical to that described in Example 2 and dyes cellulosic material in the presence of an acid-binder to give shades of good fastness to light and to washing.

EXAMPLE 63

The diazonium salt from 6.1 parts of 2-napthylamine-4:8-disulphonic acid used in Example 62 is replaced by an equimolecular proportion of diazotised 2-naphthylamine-5:7-disulphonic acid. The dyestuff so obtained when applied to cellulose in conjunction with a treatment with an acid binding agent, yields bluish violet shades having good fastness to light and to wet treatments.

EXAMPLE 64

One molecular proportion of 1:4-diamino-benzene-2:5-disulphonic acid is condensed with two molecular proportions of cyanuric chloride and one molecular proportion of the bisdichlorotriazenylamino compound so obtained is condensed with two molecular proportions of 1-amino-8-naphthol-3:6-disulphonic acid as described in Example 62.

To a solution of 12.6 parts of the hexasodium salt of the compound so obtained in 200 parts of water of 0°–5° C., there is added an ice cold suspension of the diazonium salt from 2.9 parts of 2-aminobenzoic acid together with sufficient sodium carbonate to maintain the pH at 7 and the mixture is stirred for 1 hour. 35 parts of sodium chloride are added and the precipitate is filtered off.

To a neutral solution of 15.8 parts of the octasodium salt of the compound so obtained in 200 parts of water, there is added acetic acid to bring the pH to 6.5 followed by 24 parts of a 2 N copper sulphate solution and the mixture is heated at 60° C. for 15 minutes. 25 parts of sodium chloride are added and the precipitate is filtered off and dried.

The dyestuff, so obtained, when applied to cellulose textile materials in conjunction with a treatment with an acid-binding agent, yields violet shades having good fastness to light and to wet treatments.

We claim:
1. A diazo dyestuff having the formula:

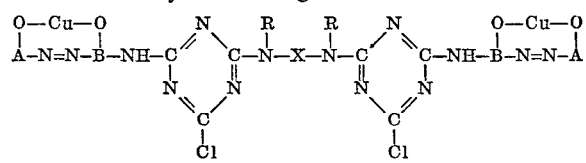

wherein
  A is selected from the group consisting of sulpho-1,2-phenylene, sulpho-1,2-phenylene carrying 1-2 substituents selected from the group consisting of Cl, $NO_2$ and $SO_3H$, disulpho-1,2-naphthylene and disulpho-1,2-naphthylene substituted by a member selected from the group consisting of $NH_2$ and $SO_3H$,
  B is selected from the group consisting of monosulphonaphthylene, disulphonaphthylene and sulphophenylene, the —O— atom being attached ortho to the azo group,
  R is selected from the group consisting of hydrogen and lower alkyl, and
  X is a divalent aliphatic or aromatic radical selected from the group consisting of ethylene, phenylene, sulphophenylene, disulphophenylene, methylphenylene, sulphomethylphenylene, carboxyphenylene, sulphodiphenylene, disulphodiphenylene, dimethoxydisulphodiphenylene, dimethyldisulphodiphenylene, dimethoxydiphenylene, phenyleneoxyphenylene, phenylenesulphonylphenylene and disulphonaphthylene.

2. The dyestuff of claim 1, wherein X is selected from the group consisting of phenylene, sulphophenylene and disulphophenylene, and A and B together contain 3 to 4 $SO_3H$ groups.

3. A dyestuff as claimed in claim 1 having the formula:

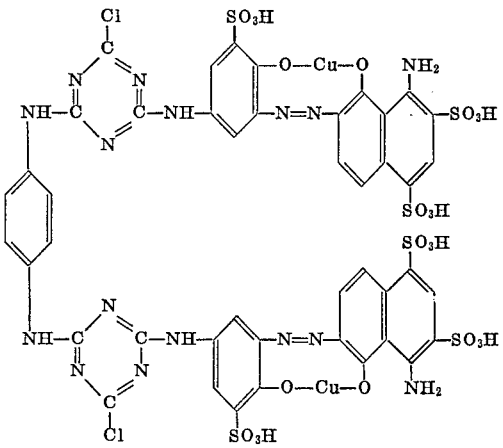

4. A dyestuff as claimed in claim 1 having the formula:

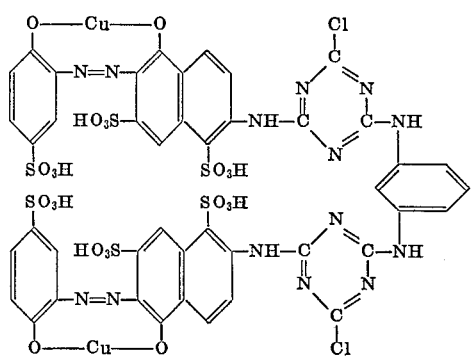

5. A dyestuff as claimed in claim 1 having the formula:

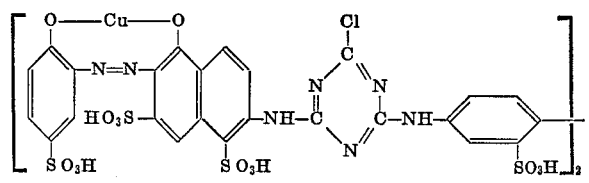

6. The dyestuff of claim 1 having the formula
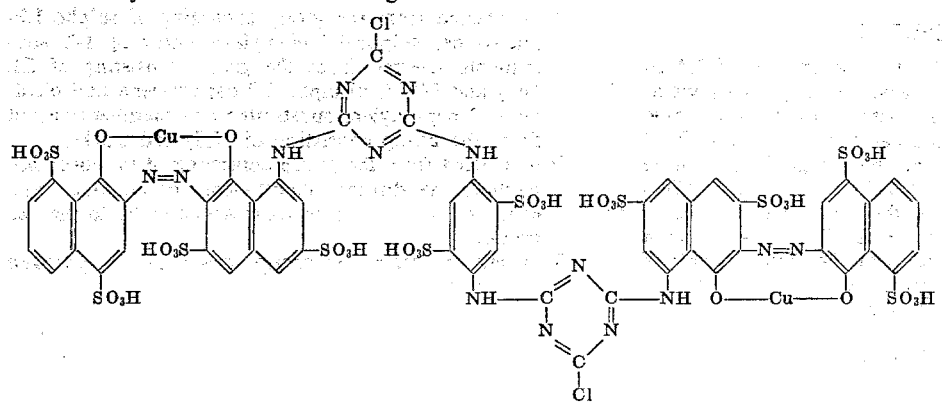
References Cited
UNITED STATES PATENTS
2,768,158  10/1956  Strobel et al. _____ 260—153
LEWIS GOTTS, Primary Examiner
D. M. PAPUGA, Assistant Examiner
U.S. Cl. X.R.
260—145, 147, 150, 151, 153